(12) United States Patent
Meyer et al.

(10) Patent No.: US 7,152,484 B2
(45) Date of Patent: Dec. 26, 2006

(54) SENSOR FOR DETECTING A PHYSICAL PROPERTY BETWEEN TWO MOVABLE BODIES HAVING HIGH TRIBOLOGICAL STRAIN

(75) Inventors: Klaus Meyer, Ditzingen (DE); Julius Nemzov, Esslingen (DE); Ulrich Mueller, Herrliberg (CH)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 10/415,894

(22) PCT Filed: Sep. 6, 2002

(86) PCT No.: PCT/DE02/03319

§ 371 (c)(1),
(2), (4) Date: Sep. 8, 2003

(87) PCT Pub. No.: WO03/025408

PCT Pub. Date: Mar. 27, 2003

(65) Prior Publication Data

US 2004/0031311 A1  Feb. 19, 2004

(30) Foreign Application Priority Data

Sep. 8, 2001  (DE)  ................................. 101 44 269

(51) Int. Cl.
*G01B 11/14* (2006.01)
*G01N 11/00* (2006.01)
(52) U.S. Cl. ...................... 73/780; 73/54.01; 73/54.14; 73/61.78; 73/774; 384/448
(58) Field of Classification Search ................ 73/53.01, 73/53.05, 53.06, 54.01, 54.02, 54.41, 54.42, 73/54.14, 61.76, 61.78, 774, 780; 106/31.95; 384/445, 448

See application file for complete search history.

(56) References Cited

U.S. PATENT DOCUMENTS 5,200,027 A * 4/1993 Lee et al. ...................... 216/51

(Continued)

FOREIGN PATENT DOCUMENTS

DE  199 25460  12/2000

(Continued)

OTHER PUBLICATIONS

Robertson, John, Hard Amorphous (Diamond-Like) Carbons, 1991, Prog. Solid State Chemistry, vol. 21, pp. 199-333.*

(Continued)

*Primary Examiner*—Hezron Williams
*Assistant Examiner*—David A. Rogers
(74) *Attorney, Agent, or Firm*—Michael J. Striker (57) ABSTRACT

A sensor element (5) detects a physical measurement variable such as a pressure, a temperature, a capacitance, or a gap width between two bodies (10, 20) that move in relation to each other during operation and experience high tribological stress. In certain areas between the surfaces of the bodies (10, 20) that move in relation to each other, in a surface region of at least one of the bodies (10), a sensitive layer (13, 30), in particular a sensor segment (13), is provided, which is separated from the body (10) by an insulation layer (12). The insulation layer (12) has at least two component layers (31, 32), wherein a first component layer (31) is a layer (31) with at least a low electrical conductivity in comparison to the sensitive layer (13) and wherein a second component layer (32) is a layer with a higher tribological stress capacity in comparison to the first component layer (31) with the comparatively low electrical conductivity and/or the insulation layer (12) is a layer that is at least essentially comprised of carbon, or contains carbon, oxygen, and silicon. The sensor element (5) proposed is primarily suited for detecting measurement variables in the contact region between lubricated components under high tribological stress.

3 Claims, 4 Drawing Sheets

U.S. PATENT DOCUMENTS

| | | | |
|---|---|---|---|
| 5,482,602 A * | 1/1996 | Cooper et al. | 204/192.11 |
| 5,559,367 A * | 9/1996 | Cohen et al. | 257/77 |
| 6,002,248 A * | 12/1999 | Binder | 324/160 |
| 6,023,961 A * | 2/2000 | Discenzo et al. | 73/54.01 |
| 6,071,597 A * | 6/2000 | Yang et al. | 428/209 |
| 6,080,470 A * | 6/2000 | Dorfman | 428/216 |
| 6,191,577 B1 * | 2/2001 | Sasaki et al. | 324/207.21 |
| 6,316,734 B1 * | 11/2001 | Yang | 174/256 |
| 6,324,899 B1 * | 12/2001 | Discenzo | 73/53.05 |
| 6,383,288 B1 * | 5/2002 | Hayashi et al. | 117/95 |
| 6,453,748 B1 * | 9/2002 | Pryor | 73/727 |
| 6,484,582 B1 * | 11/2002 | Ehrfeld et al. | 73/593 |
| 6,753,042 B1 * | 6/2004 | Bakounine et al. | 427/526 |
| 2002/0030482 A1 * | 3/2002 | Iwamoto et al. | 324/174 |
| 2002/0062694 A1 * | 5/2002 | Ehrfeld et al. | 73/593 |
| 2003/0089177 A1 | 5/2003 | Luthje et al. | |
| 2003/0107465 A1 * | 6/2003 | Hiraoka et al. | 338/13 |
| 2004/0244496 A1 * | 12/2004 | Bernhard et al. | 73/779 |
| 2004/0262367 A1 * | 12/2004 | Nakamura | 228/122.1 |

FOREIGN PATENT DOCUMENTS

| | | |
|---|---|---|
| DE | 199 54 164 A1 | 6/2001 |
| EP | 0 685 297 | 3/2000 |
| EP | 1 058 106 A | 12/2000 |
| WO | 95 08721 A | 3/1995 |
| WO | WO 200254031 A1 * | 7/2002 |

OTHER PUBLICATIONS

U. Mueller, et al: "Ultrahartstoff-Beschichtungen Aus . . . " 1997, Oberflaechen und Werkstoffe, NR. 32, p. 8-15.

Peeken H., et al: "Moderne Messtechnik Mittels . . . ", Konstruktion, Springer-Verlag, Berlin, DE, vol. 32, NR. 6, pp. 241-246.

* cited by examiner

SENSOR FOR DETECTING A PHYSICAL PROPERTY BETWEEN TWO MOVABLE BODIES HAVING HIGH TRIBOLOGICAL STRAIN

BACKGROUND OF THE INVENTION

The invention relates to a sensor element for detecting a physical measurement variable such as a pressure, a temperature, a capacitance, or a gap width between two bodies that move in relation to each other during operation and experience high tribological stress.

Lubricated contacts or elastohydrodynamic contacts of the kind that occur, for example, in bearings (ball bearings, roller bearings, or slide bearings) or other elements coupled to each other, such as gear contacts, cam-tappet contacts, etc., are subjected to very high tribological stresses. Under such operating conditions, the lubricating film between the bodies that move in relation to each other can become locally insufficient or can be broken, i.e. a so-called "mixed friction" occurs, which causes the load capacity limits of the materials used to be very quickly reached or even exceeded and causes damage to the corresponding components. In this respect, it is important to monitor the contact temperatures, contact pressures, and/or contact stresses in such highly stressed lubricated component contacts during operation in order to at least detect—e.g. by testing damage mechanisms—but ideally to prevent, the occurrence of critical loads, for example as a result of high friction energy densities, which, when exceeded, cause components, for example, of an injection system, to fail due to adhesion ("seizing" in automotive engineering).

Since contact points are subjected to very high tribological stresses, primarily when there is mixed friction, the sensor elements used must also be able to withstand very high mechanical and tribological stresses. On the other hand, they should exert as little influence as possible on the measurement variables or friction conditions to be detected.

A sensor element for detecting temperature or pressure between two bodies that move in relation to each other and experience high tribological stress is known from H. Peeken and A. Köhler, Konstruktion 32 (June 1980), pp. 241–246 "Modern Metrology by means of Vapor-Deposited Transducers in Slide and Roller Bearings" [Moderne Messtechnik mittels aufgedampfter Geber in Gleitund Wätlzlagern]. This sensor element makes use of the fact that in many materials, the electrical resistance depends on both the temperature and the pressure so that after a calibration measurement, the pressure and/or temperature can be determined simply by measuring the resistance.

In particular in the above-mentioned publication, metal layers are deposited onto the components to be tested; these metal layers are designed and positioned so that measurement signal is picked up at the desired location. It is also necessary that the actual sensor segment and the contact surfaces or strip conductors connected to it be electrically insulated from the component underneath them, which is normally metallic. To this end, a glass layer or ceramic layer, for example a silicon oxide layer or an aluminum oxide layer, is produced as an insulating intermediary layer between the sensor segment and the component that is provided with it. In addition, $Cr_2O_3$ layers are also already known as insulating intermediary layers.

The disadvantage of the known insulation layers between the sensor segment and the component that is provided with it lies in the fact that due to their differing coefficients of thermal expansion, in many cases they adhere poorly for example to metals, a problem which frequently cannot be satisfactorily solved, even with an additional layer of adhesion promoter. Another disadvantage lies in the fact that previously known insulation layers are relatively brittle and are insufficiently able to withstand tribological stress.

The object of the current invention was to produce a sensor element for detecting a physical measurement variable such as the pressure or temperature, between two bodies that move in relation to each other during operation and experience high tribological stress, where the actual sensor segment or in general, the actual sensitive layer, is separated from the body underneath it by an insulation layer, which assures a sufficient electrical insulation and is also able to withstand very high tribological stresses. In this connection, an insulation layer with sufficient electrical insulating properties is understood to be a layer whose electrical conductivity does not necessarily have to be zero, but is significantly lower than the electrical conductivity of the sensitive layer and is preferably so low as to be negligible.

SUMMARY OF THE INVENTION

The sensor element according to the invention has the advantage over the prior art that the insulation layer adheres very favorably to the body that is provided with it, even under extremely high mechanical loads and does not come off even when there are temperature changes and temporary temperature increases. It is also significantly less brittle and less prone to wear than insulation layers known from the prior art.

It is also particularly advantageous if the insulation layer is comprised of at least two component layers, one of which is a component layer with a high capacity for tribological stress, which has a comparatively high degree of hardness, i.e. a hardness of at least 1000 HV, preferably more than 3000 HV, and a comparatively low coefficient of friction, and the other of which is a component layer, which has a considerably reduced electrical conductivity in comparison to the component layer with the high capacity for tribological stress. This allows the functions of "electrical insulation" and "tribological stress capacity" that the insulation layer should fulfill simultaneously to be divided up between these two component layers.

In the context of the current specification, a layer that experiences or can withstand high tribological stress is generally understood to be a layer that is subjected to contact pressures of at least 1 MPa, in particular 10 MPa to 20 GPa, and can withstand them, particularly over the long term.

It is thus advantageous if the high tribological stress capacity component layer of the insulation layer is at least essentially comprised of carbon, in particular a diamond-like carbon or an amorphous diamond-like carbon. It is also advantageous if the component layer with the comparatively low electrical conductivity, in addition to carbon, which is preferably the main ingredient—preferably in the form of a diamond-like carbon or an amorphous diamond-like carbon, also contains oxygen and silicon, preferably as secondary ingredients, which results in a reduction of the electrical conductivity of the amorphous diamond-like carbon, which otherwise has a relatively high electrical conductivity.

In particular with regard to improving the adhesion and the tribological durability, it has turned out to be advantageous if the insulation layer has a number of recurring pairs of component layers stacked one on top of the other, wherein underneath the sensor segment or sensitive layer, first comes the layer with the higher tribological stress capacity and only under that, comes the component layer that is insulating or has a low electrical conductivity in comparison to the sensitive layer.

Alternatively to the use of an insulation layer comprised of at least two component layers, however, in some applications, as explained above, it is advantageously also sufficient if the insulation layer is not comprised of at least two component layers of different compositions, but is at least essentially comprised of carbon or in addition to carbon, contains oxygen and silicon. In this instance, the requirements "high tribological stress capacity" and "electrically insulating" are fulfilled by this one layer, which can to that end have either a homogeneous composition or a graduated composition perpendicular to the layer plane, which yields a fluid transition to an insulation layer with a number of component layers.

In order to improve the abrasion resistance and mechanical stress capacity of the sensitive layer, which is preferably embodied in the form of a sensor segment—a sensor segment also being understood to mean a meander-shaped, structured segment, and in order to protect this sensitive layer from being rapidly destroyed, particularly in the event of mixed friction, it is advantageous if the sensor segment or the sensitive layer is provided with an abrasion resistant covering layer that is insulating or has a low electrical conductivity, preferably with a thickness of less than 500 nm. This covering layer is advantageously also a layer made of carbon, in particular a diamond-like carbon or an amorphous diamond-like carbon; in addition to carbon as the main ingredient, this covering layer can also contain oxygen and silicon in order to reduce the electrical conductivity. In this respect, the covering layer has a structure that is the same or very similar to that of the insulation layer or that of the component layers of the insulation layer and can therefore also be advantageously deposited using a manufacturing process that is correspondingly the same or similar.

Only a few specially selected metals are suitable as the material for the actual sensitive layer, such as chromium, platinum, titanium, a nickel-chromium alloy, preferably with the composition 80 wt. % Ni and 20 wt. % Cr, or a nickel-copper-manganese alloy, preferably with the composition 86 wt. % Cu, 12 wt. % Mn, and 2 wt. % Ni (manganin).

The actual sensitive layer is also advantageously kept as small and flat as possible so that in the vicinity of the contact point, the geometry of the sensitive layer produces as little as possible influence on the physical measurement variable to be detected. It is particularly advantageous if the sensitive layer has a length of 10 μm to 5 mm, a width of 50 nm to 50 μm, and a thickness of less than 200 nm, in particular less than 10 nm.

A further advantageous possibility for protecting the sensitive layer from a rapid wear, primarily in critical operating states, and for reducing its tribological stress during operation, is comprised in placing the sensitive layer on the insulation layer inside a recess that has been produced in a surface region of the corresponding body or the insulation layer.

In order to permit the most precise possible detection of the desired physical measurement variable, the upper edge of the sensitive layer or of the sensitive layer provided with the covering layer should be as flush as possible with the surface of the body or should protrude beyond or be recessed from this surface by maximally 500 nm. It is particularly advantageous if the sensitive layer protrudes beyond the surface of the body on the order of magnitude of its surface roughness or is recessed from it in a corresponding fashion, i.e. if possible by an amount less than 200 nm.

BRIEF DESCRIPTION OF THE DRAWINGS

The invention will be explained in detail in conjunction with the drawings and in the description that follows.

FIG. 3A shows another alternative embodiment of the invention, and FIG. 4 gives a detailed sectional view of the layer structure of the sensor element on the body according to FIG. 2 or also FIG. 3, (with a covering layer).

DESCRIPTION OF THE PREFERRED EMBODIMENTS

Figure 1:
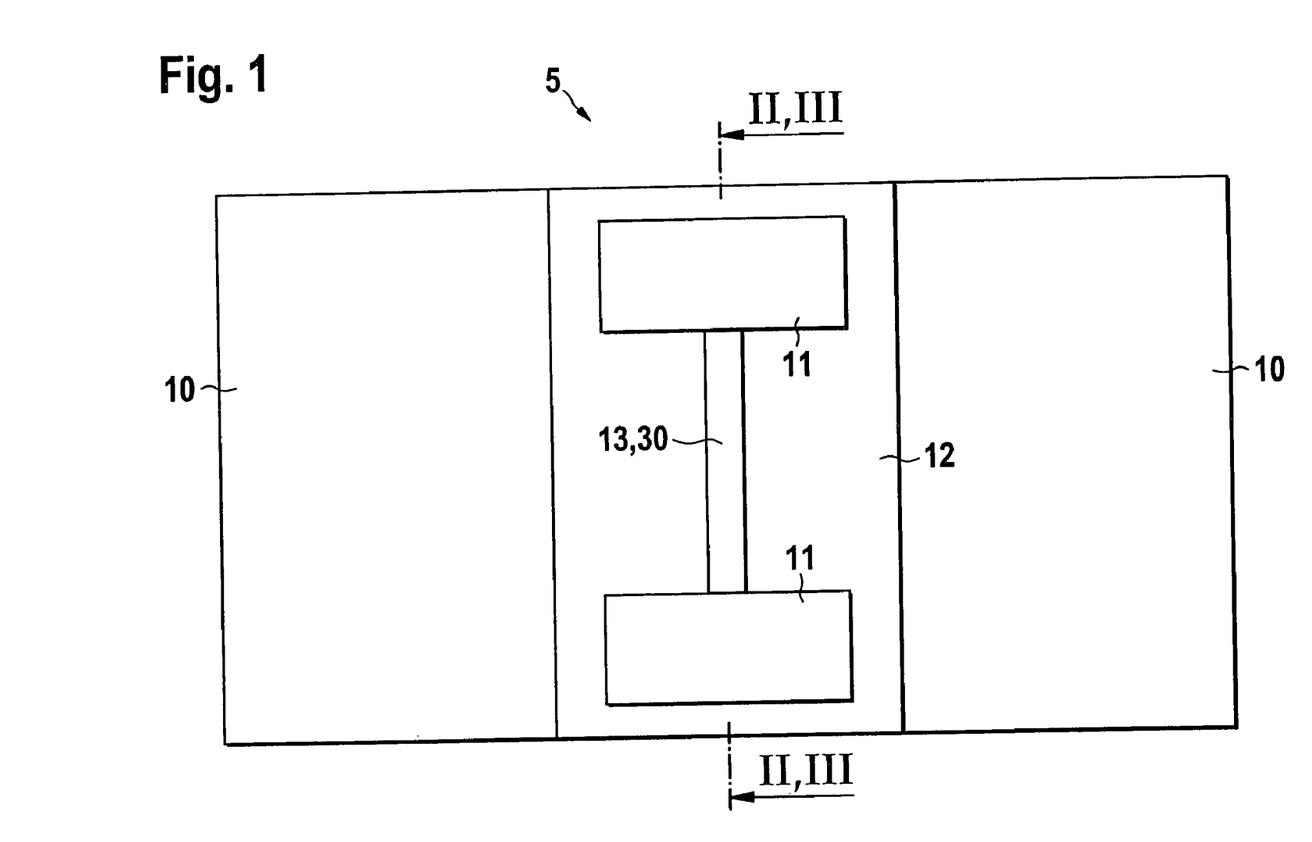
FIG. 1 shows a top view of a body with a sensor element attached to it.

FIG. 1 shows a metallic substrate 10, for example a metallic ignition distributor shaft in a high-pressure injection system of a motor vehicle or another technical surface with a roughness that can be up to several μm, certain areas of which have an insulation layer 12 deposited on them, with two contact surfaces 11, which are connected to each other by means of a sensitive layer 30 embodied as a sensor segment 13 so that the contact surfaces 11 and the sensor segment 13 form a double-T structure, which, along with strip conductors that are not shown, is connected as a sensor element 5 to external electronic components as part of an electronic measurement bridge. In addition, the influence of a physical measurement variable to be detected, in particular a changing pressure, a changing mechanical stress, or a changing temperature, causes the sensor segment 13 to change in at least one measurable physical property, in particular its electrical resistance. In addition, the sensor element 5, which is connected as part of a capacitor, for example, can also detect a changing electrical capacitance or a changing gap width.

In addition to the temperature and/or pressure in the contact region between the contact surfaces 11, it is therefore possible, for example by means of the capacitance, to also detect the width of a gap 21 between the contact surfaces 11 of the substrate 11 and an opposing body, particularly as a function of time, wherein the medium or lubricant between the contact surfaces 11 constitutes the dielectric of a capacitor and the contact surfaces 11 constitute or are correspondingly connected to the plates of the capacitor.

Figure 2:
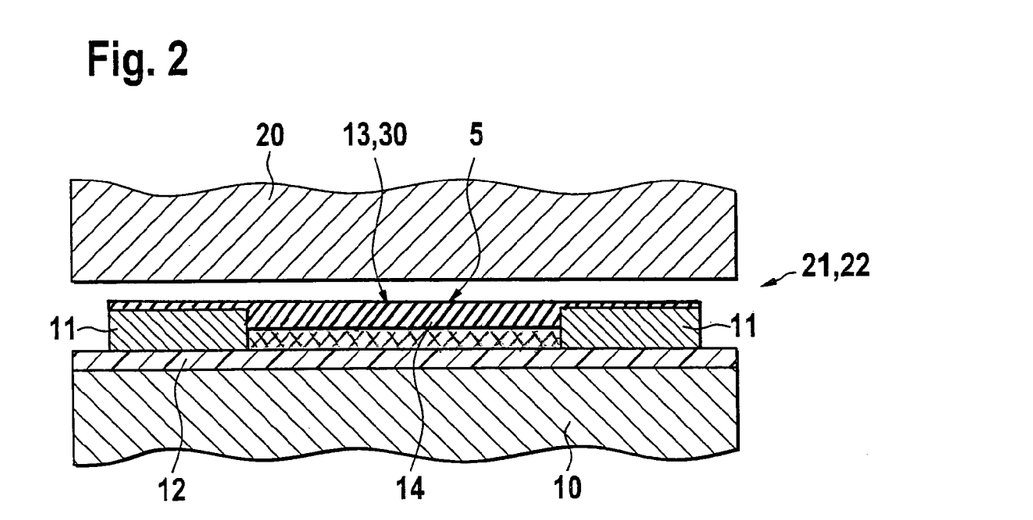
FIG. 2 shows a section through FIG. 1 along the cutting line depicted in it, where a second body is also shown, which is spaced apart from the first body and moves in relation to it.

In addition to the substrate 10, FIG. 2 shows a metallic opposing body 20 that is disposed opposite the substrate, for example a bushing of an ignition distributor shaft. The substrate 10 and the opposing body 20 are also separated from each other by a gap 21, which contains a lubricant 22, for example oil or a fuel. In addition, FIG. 2 shows that for example in order to detect a contact pressure and/or a contact temperature, the sensor element 5 is disposed between the bodies 10, 20 that move in relation to each other and experience high tribological stress. It is clear from this that the contact surfaces 11 and the sensor segment 13 are disposed on the insulation layer 12 and that the sensor segment 13 is provided with an additional covering layer 14, i.e. the sensor segment 13 disposed on the insulation layer 12 is comprised of the covering layer 14 and the layer 30 that is sensitive with regard to the physical measurement variable to be detected.

In the example explained, the covering layer 14 is an abrasion resistant, covering layer that is insulating or has a low electrical conductivity, with a thickness of less than 500 nm, which contains an amorphous diamond-like carbon, preferably as a main ingredient, and contains oxygen and silicon, preferably as secondary ingredients. Alternatively, the covering layer 14 can also be essentially comprised only of carbon, in particular an amorphous diamond-like carbon, since this still provides it with a considerably lower electrical conductivity than the sensitive layer 30.

In the example explained, the sensitive layer 30 that constitutes the sensor segment 13 is comprised of chromium, titanium, platinum, a nickel-chromium alloy with 80 wt. % Ni and 20 wt. % Cr, or a nickel-copper-manganese alloy with 86 wt. % Cu, 12 wt. % Mn, and 2 wt. % Ni (manganin), and has an electrical resistance of 500 Ω to 3 kΩ.

Overall, depending on the concrete application, the sensor segment 13 in the example explained has a length of 10 μm to 5 mm, a width of 50 nm to 50 μm, and a thickness of less than 200 nm, preferably less than 10 nm. Finally, it is clear from FIG. 2 that the thickness of the sensor segment 13 is preferably different from and in particular, is considerably less than that of the contact surfaces 11.

Figure 3:
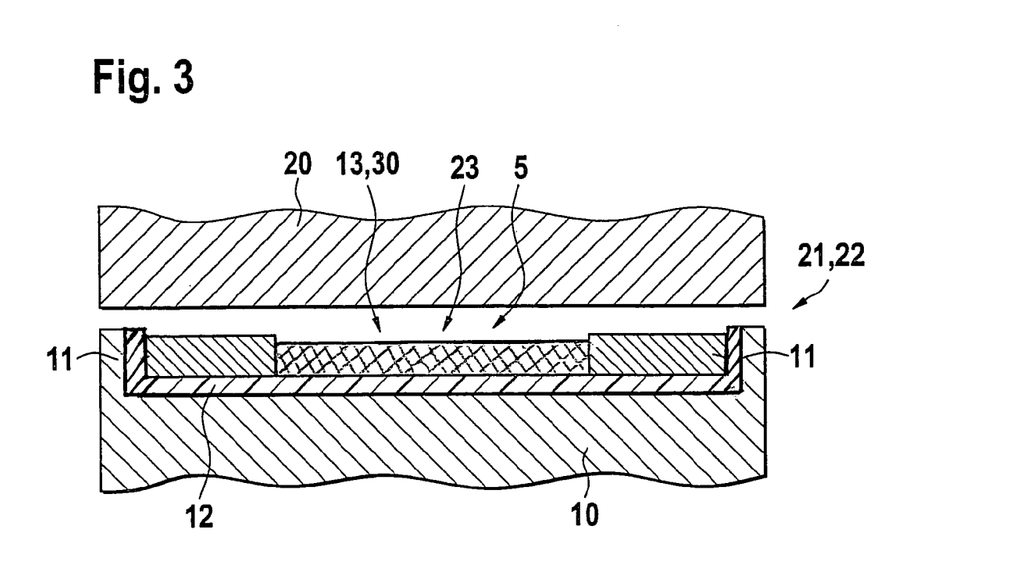
FIG. 3 shows an alternative embodiment to the one in FIG. 2, likewise depicted as a section through FIG. 1 along the cutting line depicted in it.

The exemplary embodiment according to FIG. 3 differs from the exemplary embodiment according to FIG. 2 merely in that a recess 23 whose dimensions correspond to the dimensions of the contact surfaces 11 and of the sensor segment 13 is provided in the region of the surface of the substrate 10, wherein the sensor segment 13 and the contact surfaces 11 are disposed on the insulation layer 12 that covers the bottom of the recess 23. The upper edge of the sensor segment 13 here, which is possibly provided with the optional covering layer 14, is as flush as possible with the surface of the body 10. To accomplish this, the recess 23 was initially etched into the substrate 10 by means of an appropriately designed mask, and then the insulation layer 12 was deposited precisely in the region of the recess 23 so that the recess 23 is then filled again, in particular completely. The size of the recess 23 should be dimensioned so that there is sufficient space on the insulation layer 12 to fully accommodate the contact surfaces 11 and the associated strip conductors as well as the sensor segment 13. Then another appropriately designed mask was used to etch a second recess into the insulation layer 12 for the contact surfaces 11 and the associated strip conductors. The contact surfaces 11 and the associated strip conductors are then inserted into this second recess so that it, too, is filled again, preferably completely. Then, if necessary, an appropriately designed mask is used to etch a third recess into the insulation layer 12 for the sensor segment 13; the sensor segment 13 or the sensitive layer 30 is then deposited into this third recess. If an additional covering layer 14 and/or a bonding layer 33 is to be subsequently deposited, then this must be appropriately taken into consideration in the etching, particularly of the first recess. The covering layer 14 here preferably also extends over the contact surfaces 11 and possibly associated strip conductors, if this region contacts the opposing body 20 during operation.

Alternatively, the upper edge of the sensor segment 13 or the upper edge of the covering layer 14 can also protrude beyond or be recessed from the surface of the substrate 10 by maximally 500 nm. Preferably the height by which the sensor segment 13 or the covering layer 14 protrudes beyond or is recessed from the surface of the substrate 10 is less than the surface roughness of the substrate 10.

Figure 3A:
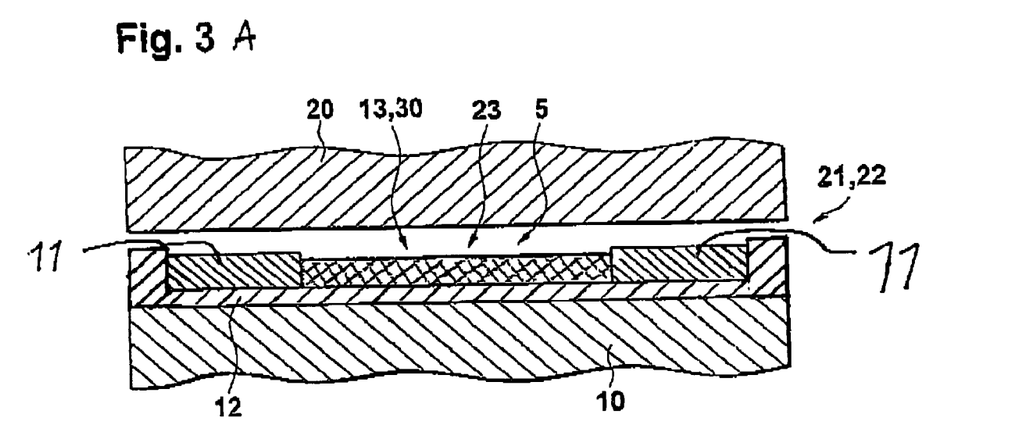

In another alternative embodiment shown in FIG. 3A the insulation layer 12 can be deposited onto the substrate 10 first and then the recess 23 can be produced in the insulation layer 12, which is followed by the depositing or production of the sensor segment 13 and the contact surfaces 11 in the recess.

Figure 4:
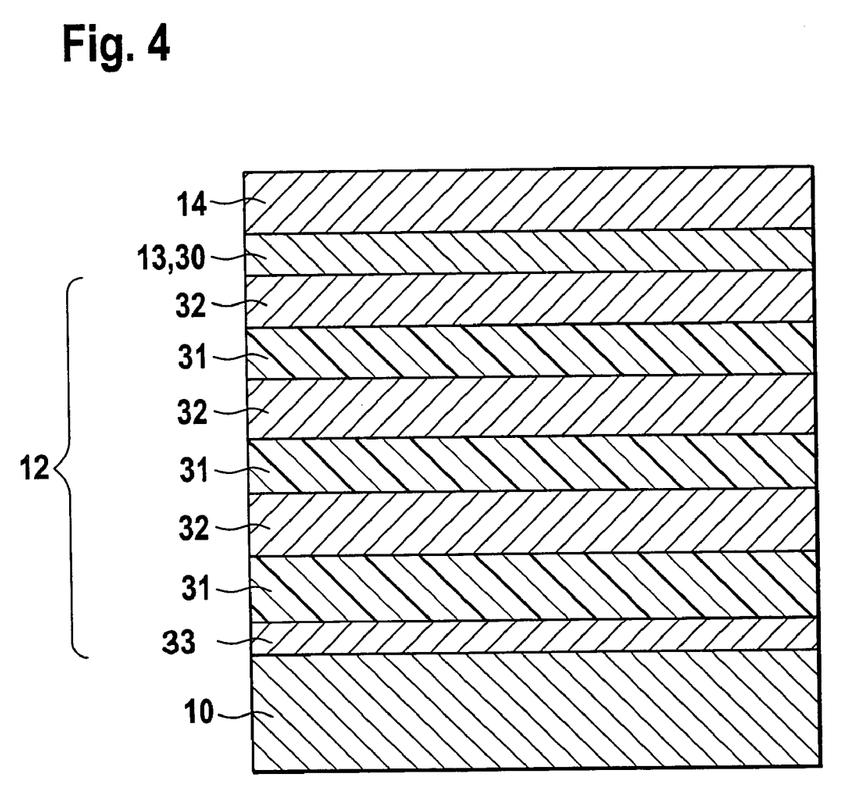

FIG. 4 gives a detailed depiction of the design of the insulation layer 12 on the substrate 10, in which a bonding layer 33 is also provided between the substrate 10 and the insulation layer 12, and in which the covering layer 14 is also provided on the insulation layer 12 in addition to the sensitive layer 30. The specific electrical resistance of the insulation layer 12 as a whole is approx. $3 \cdot 10^7$ mΩ.

The bonding layer 33 according to FIG. 4 has a thickness of 20 nm to 1 μm and can in addition optionally also be provided between the sensor segment 13, i.e. the sensitive layer 30, and the covering layer 14, with a thickness of 20 nm to 1 μm. An additional bonding layer between the sensitive layer 30 and the covering layer 14 was not required in the exemplary embodiment explained above.

The bonding layer 33 is preferably comprised of carbon, in particular a diamond-like carbon or an amorphous diamond-like carbon, and silicon, or contains these elements as essential ingredients. Alternatively, it can also be comprised of a metal such as chromium or titanium, a metal alloy, or a semiconductor such as silicon, or the bonding layer 33 has a number of component layers of different compositions stacked one on top of the other. One of these component layers, for example, is a layer that is comprised of carbon, in particular a diamond-like carbon or an amorphous diamond-like carbon, and silicon or that contains these elements as essential ingredients, and another of these component layers, for example, is a layer that is comprised of a metal such as chromium or titanium or a metal alloy. However, other material combinations, even the other materials mentioned above for the bonding layer 33, can also be used in the component layers.

The insulation layer 12 according to FIG. 4 is comprised of a total of six component layers, which can be integrated into three component layer pairs. In the example explained, each of these six component layers has a thickness of approx. 660 nm. The component layers that make up the insulation layer 12 are divided up into component layers 31 with at least a low electrical conductivity in comparison to the sensor segment 13 and component layers 32 with a higher tribological stress capacity than the component layers 31 with the comparatively low electrical conductivity, wherein the component layers 32 with the higher tribological stress capacity simultaneously have a higher electrical conductivity than the component layers 31 with the comparatively low electrical conductivity or have a favorable electrical conductivity in comparison to them. In particular, the component layer 32 with the higher tribological stress capacity has the highest degree of hardness possible in comparison to the layer 31 with the comparatively low electrical conductivity, preferably a hardness of greater than 1000 HV, particularly preferably greater than 3000 HV, and as low a friction coefficient as possible, preferably a friction coefficient of less than 0.01.

The layer 32 with the higher tribological stress capacity is preferably at least essentially comprised of carbon, in particular an amorphous diamond-like carbon. The layer 31 with the comparatively low electrical conductivity is preferably comprised of carbon, in particular an amorphous diamond-like carbon, and in addition, also contains oxygen and silicon, primarily in order to reduce its electrical conductivity.

In addition, it is important that directly under the sensor segment 13 or the sensitive layer 30, first comes a layer with a high tribological stress capacity, i.e. the component layer 32, and then under that comes a component layer with at least a low electrical conductivity in comparison to the sensor segment 13, i.e. the component layer 31. These two component layers 31, 32 constitute a component layer pair, which recurs several times, as depicted in FIG. 4.

In general, the component layer 32 with the higher tribological stress capacity and the component layer 31 with the comparatively low electrical conductivity each have a layer thickness of 50 nm to 5 µm, in particular of 300 nm to 1 µm.

Numerous manufacturing processes are known from the prior art for producing amorphous diamond-like carbon layers, of the kind required to produce the insulation layer 12, the covering layer 14, and the bonding layer 33 in the examples explained above.

For example, an overview of the properties of amorphous, diamond-like carbon layers can be found in the following articles: J. Robertson, "Hard Amorphous (Diamond-Like) Carbon", Progress in Solid State Chemistry, 21, 4 (1991), pp. 199 to 333 or U. Müller, R. Hauert, and M. Tobler "Ultrahartstoff-Beschichtungen aus Kohlenstoff" [Ultrahard Material Layers Made of Carbon], Oberflächen und Werkstoffe [Surfaces and Materials], 38, (1997), pp. 8 to 15.

It has become common practice to use amorphous diamond-like carbon layers deposited primarily using PACVD ("plasma-activated chemical vapor deposition") for abrasion resistant protective layers. In this method, a plasma is generated in a deposition chamber at a low gas pressure of less than 10 kPa through the application of a sufficiently high voltage (d.c. voltage or a.c. voltage of a few Hertz to several GHz), for example a high-frequency voltage of 13.56 MHz, and a reactive gas is supplied to this plasma, for example acetylene or another hydrocarbon gas, such as an alkane (methane, ethane, propane, butane, . . . ), alkene, (ethene, propene, butene, . . . ), or alkyne that is gaseous under normal circumstances, or also a compound that is liquid under normal conditions, such as benzene, cyclohexane, or toluene. Acetylene is preferable since this gas has the highest carbon-to-hydrogen ratio and produces the densest and hardest layers.

As a rule, the amorphous diamond-like carbon layers produced in this manner, which are also better known as hydrocarbon layers, have a not very high specific electrical resistance on the order of magnitude of $10^4$ mΩ. With a typical layer thickness of approx. 1 mΩ and a contact area of approx. 0.5 cm$^2$, this yields a short circuit resistance of approx. 200 Ω. This value should be compared with the desired electrical resistance of the sensor segment 13, which is on the order of magnitude of 1 kΩ. In order to produce a sufficient electrical insulation of the sensor segment 13 in relation to the insulation layer 12, however, it is desirable for the insulation layer 12 to have a specific electrical resistance that is at least three orders of magnitude greater, i.e. preferably of approx. $10^7$ mΩ.

This increase in the specific electrical resistance of the insulation layer 12 is achieved through the composition of the insulation layer 12 and/or through the previously explained division into component layers 31, 32, wherein the mechanical properties of a pure amorphous diamond-like carbon layer are largely retained for the insulation layer 12 as a whole.

The desired increase in the specific electrical resistance of an amorphous diamond-like carbon layer for producing the component layer 31 with the at least low electrical conductivity can be achieved in the simplest manner by changing the deposition parameters during the manufacturing process, in particular by admixing a reactive gas such as an organosilanol during the layer deposition. In this case, use is made of the fact that the integration of silicon-oxygen compounds, for example, into the amorphous diamond-like carbon layer reduces its electrical conductivity.

This method, however, is limited in that the integration of these additional compounds or elements does in fact increase the specific electrical resistance, but also simultaneously involves an unacceptable degradation of the tribological properties of the layer that is produced. Thus the addition of hexamethyldisiloxane causes amorphous diamond-like carbon layers to become glass-like so that a very brittle layer is produced, which is no longer able to withstand high mechanical stresses.

The provided division of the insulation layer 12 into two component layers 31, 32 that have different functions succeeds on the whole very well and simply at fulfilling the requirements of the insulation layer 12 with regard to both electrical conductivity and mechanical durability. In particular, the above-described sequence of the component layer 31, which has at least a low electrical conductivity, and the component layer 32, which has a higher tribological stress capacity and is more electrically conductive, as a whole produces an insulation layer 12 that has a high mechanical load capacity, a sufficient ductility and adhesion, and that as a whole, is sufficiently electrically insulating.

Based on these preliminary considerations, the bonding layer 33 is preferably produced by depositing a metal or a combination of different metals by means of PVD ("physical vapor deposition"), CVD ("chemical vapor deposition"), or PACVD ("plasma-activated chemical vapor deposition") using a metalliferous gas, for example a metal chloride or an organometal, as a reactive gas. In addition, tetramethylsilane or one of the previously mentioned hydrocarbon gases can also be used as the reactive gas for the deposition of the bonding layer 33.

The component layer 31 with at least a low electrical conductivity is deposited with the aid of the PACVD method explained above, using a mixture of one or more gases from the group including oxygen, silane, in particular monosilane, organosilane, in particular tetramethylsilane, organosilanol, in particular hexamethyldisiloxane, and hydrocarbon gas as the reactive gas. Preferably, a mixture of hexamethyldisiloxane and acetylene is used as the reactive gas, which is particularly preferably comprised of 75 vol. % hexamethyldisiloxane and 25 vol. % acetylene. Alternatively, however, it is also possible to use hexamethyidisiloxane exclusively. In order to deposit the component layer 32 with the higher tribological stress capacity, which simultaneously has a better electrical conductivity, preferably acetylene is used as the reactive gas in the PACVD method explained above.

Finally, the layer sequence of the component layers 31, 32 comprising the insulation layer 12 is preferably produced using the PACVD method explained above to produce the entire coating in one pass, i.e. without interrupting the plasma, wherein at the transition from one component layer to the other, a change in the reactive gas takes place either abruptly, progressively, i.e. in a few small steps, or continuously or quasi-continuously, i.e. in a large number of small steps. Apart from that, the layer thickness of the insulation layer 12 as a whole should be no more than 6 µm.

In view of the fact that the influence of the sensor element 5 on the measurement result in the detection of the physical measurement variable should be as low as possible, the area of the sensor element 5 viewed from above and in particular the area of the insulation layer 12 are always kept as small as possible so that to the greatest extent possible, the lubricated contact that occurs takes place only between the primary surfaces. This aim is also served by the embedding of the sensor element 5 into the surface of the substrate 10 to be tested and by the requirement that the surface of the sensor segment 13 or the covering layer 14 be situated as close as possible to the same height as the upper edge of the substrate 10.

Finally, an embodiment of the covering layer 14 that is as thin as possible also results in a reduced distortion of the measurement signal of the sensor element 5.

It should incidentally also be mentioned that the substrate 10 and/or the opposing body 20 are comprised, for example, of hardened steel (DIN material number 1.4125 or 1.3505).

The invention claimed is:

1. A sensor element for detecting a physical measurement variable such as a pressure, a temperature, a capacitance, or a gap width between two bodies (10, 20) that move in relation to each other during operation and experience high tribological stress, wherein in certain areas between the surfaces of the bodies (10, 20) that move in relation to each other, in a surface region of at least one of the bodies (10), a sensitive layer (13, 30) is provided, which is separated from the body (10) by an insulation layer (12), characterized in that the insulation layer (12) is at least essentially comprised of an amorphous, diamond-like carbon, or contains amorphous, diamond-like carbon, oxygen, and silicon, wherein the sensitive layer (13, 30) is provided with an abrasion resistant covering layer (14), which is insulating or has a low electrical conductivity in comparison to the sensitive layer (13, 30) and has a thickness of less than 500 nm, wherein a bonding layer (33) is provided between the insulation layer (12) and the body (10) and/or between the sensitive layer (13, 30) and the covering layer (14).

2. The sensor element according to claim 1, wherein the bonding layer (33) between the insulation layer (12) and the body (10) has a thickness of 20 nm to 1 μm and/or the bonding layer (33) between the sensitive layer (13, 30) and the covering layer (14) has a thickness of 20 nm to 1 μm.

3. The sensor element according to claim 1, wherein the bonding layer (33) contains carbon, in particular a diamond-like carbon or an amorphous diamond-like carbon, and silicon, that the bonding layer (33) is comprised of a metal such as titanium or chromium, an alloy, or a semiconductor such as silicon, or that the bonding layer (33) has at least two component layers of different composition disposed one on top of the other.

* * * * *